United States Patent
Kamichi et al.

(10) Patent No.: US 8,952,564 B2
(45) Date of Patent: *Feb. 10, 2015

(54) POWER SOURCE SYSTEM FOR ELECTRIC POWERED VEHICLE

(75) Inventors: Kensuke Kamichi, Aichi-gun (JP); Tomokazu Masuda, Kasugai (JP); Daisuke Ueo, Toyota (JP); Takahiro Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 498 days.

This patent is subject to a terminal disclaimer.

(21) Appl. No.: 13/386,255

(22) PCT Filed: Aug. 7, 2009

(86) PCT No.: PCT/JP2009/064021
§ 371 (c)(1),
(2), (4) Date: Jan. 20, 2012

(87) PCT Pub. No.: WO2011/016135
PCT Pub. Date: Feb. 10, 2011

(65) Prior Publication Data
US 2012/0187759 A1    Jul. 26, 2012

(51) Int. Cl.
*B60L 11/18* (2006.01)
*B60L 3/00* (2006.01)
(Continued)

(52) U.S. Cl.
CPC . *B60L 3/003* (2013.01); *B60L 7/14* (2013.01); *B60L 11/14* (2013.01); *B60L 11/1803* (2013.01);
(Continued)

(58) Field of Classification Search
CPC .................................................. B60L 11/18

USPC .......................................................... 307/10.1
See application file for complete search history.

(56) References Cited

U.S. PATENT DOCUMENTS 8,478,469 B2 * 7/2013 Ueo et al. ........................ 701/22
2009/0001926 A1 * 1/2009 Sato .............................. 320/102
(Continued)

FOREIGN PATENT DOCUMENTS

JP    A-07-111735    4/1995
JP    A-08-107605    4/1996
(Continued)

OTHER PUBLICATIONS

Nov. 10, 2009 International Search Report issued in International Application No. PCT/JP2009/064021 (with translation).
(Continued)

*Primary Examiner* — Rexford Barnie
*Assistant Examiner* — Joseph Inge
(74) *Attorney, Agent, or Firm* — Oliff PLC

(57) ABSTRACT

A PLG-ECU for external charging is provided separately from an HV-ECU for vehicle running, and configured to be capable of controlling external charging relays to be turned on/off. A sub DC/DC converter converting the output voltage of a charger into an auxiliary system voltage at the time of external charging is provided separately from a main DC/DC converter of large capacity used at the time of vehicle running. At the time of external charging, PLG-ECU can execute external charging without starting a vehicle running system while sub DC/DC converter can generate an auxiliary system voltage. Since external charging can be executed while system main relays each are kept turned off, a high voltage is not applied to components at the succeeding stage. Consequently, a main battery can be externally charged without exerting any influence on the durability and the life of each component of the vehicle running system.

9 Claims, 5 Drawing Sheets

(51) Int. Cl.
*B60L 7/14* (2006.01)
*B60L 11/14* (2006.01)

(52) U.S. Cl.
CPC ......... *B60L 11/1816* (2013.01); *B60L 11/1861* (2013.01); *B60L 11/1868* (2013.01); *B60L 11/1887* (2013.01); *B60L 2210/10* (2013.01); *B60L 2210/40* (2013.01); *B60L 2220/14* (2013.01); *B60L 2240/12* (2013.01); *B60L 2240/545* (2013.01); *B60L 2250/10* (2013.01); *Y02T 10/7044* (2013.01); *Y02T 10/7077* (2013.01); *Y02T 10/7088* (2013.01); *Y02T 10/7216* (2013.01); *Y02T 90/121* (2013.01); *Y02T 90/127* (2013.01); *Y02T 90/14* (2013.01); *Y02T 10/7241* (2013.01); *Y02T 10/7066* (2013.01); *Y02T 90/34* (2013.01); *Y02T 10/6269* (2013.01)
USPC ....................................... 307/10.1

(56) References Cited

U.S. PATENT DOCUMENTS

| | | | |
|---|---|---|---|
| 2010/0054007 A1* | 3/2010 | Jung | 363/126 |
| 2010/0270860 A1* | 10/2010 | Kamaga | 307/10.7 |
| 2011/0187184 A1* | 8/2011 | Ichikawa | 307/10.1 |

FOREIGN PATENT DOCUMENTS

| | | |
|---|---|---|
| JP | A-2007-228753 | 9/2007 |
| JP | A-2008-187884 | 8/2008 |
| JP | A-2009-27774 | 2/2009 |
| JP | A-2009-225587 | 10/2009 |
| JP | A-2010-279159 | 12/2010 |

OTHER PUBLICATIONS

Mar. 27, 2013 Notice of Allowance issued in U.S. Appl. No. 13/321,039.

* cited by examiner

POWER SOURCE SYSTEM FOR ELECTRIC POWERED VEHICLE

TECHNICAL FIELD

The present invention relates to a power source system for an electric powered vehicle, and particularly to a power source system for an electric powered vehicle equipped with a power storage device chargeable by a power source outside the vehicle.

BACKGROUND ART

Electric vehicles, hybrid vehicles and fuel cell vehicles have been known as electric powered vehicles configured such that an electric motor for driving the vehicle can be driven by electric power from a power storage device mounted on the vehicle represented by a secondary battery. For an electric powered vehicle, a configuration for charging, the power storage device mounted on the vehicle by a power source outside the vehicle (hereinafter also simply referred to as an "external power source") has been proposed. In the following, charging of a power storage device by an external power source will also be simply referred to as "external charging".

By way of example, Japanese Patent Laying-Open No. 2009-027774 (PTL 1) describes a configuration of an externally chargeable vehicle, including a battery B1 chargeable from the outside of the vehicle, a DC/DC converter 33 lowering the voltage of battery B1, a battery B3 charged by the output of DC/DC converter 33, and an auxiliary load 35 receiving power supply from battery B3.

Particularly, in the configuration of PTL 1, DC/DC converter 33 is operated continuously while the vehicle is running, and DC/DC converter 33 is operated intermittently in accordance with the voltage output from battery B3 while the vehicle is externally charged. This improves charging efficiency at the time of external charging.

CITATION LIST

Patent Literature

PTL 1: Japanese Patent Laying-Open No. 2009-027774

SUMMARY OF INVENTION

Technical Problem

In PTL 1, however, system components including a DC/DC converter generating a power supply voltage for an auxiliary system are used in common both at the time of vehicle running and at the time of external charging. This leads to a configuration in which the voltage of battery B1 serving as a main battery is applied to the components (representatively, a boost converter and an inverter) of the vehicle running system also at the time of external charging.

Therefore, the durability design and the life of each component may be changed due to the influence of external charging, which may cause an increase in the cost of the components and also cause difficulty in system design. Furthermore, there is a great difference in power consumption between at the time of vehicle running and at the time of external charging. Accordingly, when the components are used in common between at the time of vehicle running and at the time of external charging, the efficiency at the time of external charging may be decreased.

The present invention has been made to solve the above-described problems. An object of the present invention is, in an electric powered vehicle chargeable by an external power source, to prevent the durability and the life of each component of the power source system from being changed due to the influence of external charging, to optimize the system configuration in a simplified design.

Solution to Problem

The present invention provides a power source system for an electric powered vehicle chargeable by an external power source outside of the vehicle, including: rechargeable main and sub power storage devices, a charger, a power control unit, first and second switches, an auxiliary load, first and second voltage converters, and a controller for controlling an operation of the electric powered vehicle. The charger is configured to convert electric power supplied from the external power source into electric power for charging the main power storage device at a time of external charging for charging the main power storage device by the external power source. The power control unit is configured to control driving of an electric motor for generating vehicle driving power, by electric power conversion between a main power supply line and the electric motor. The first switch is connected between the main power storage device and the main power supply line. The second switch is connected parallel to the first switch, between the charger and the main power storage device. The auxiliary load is configured to operate by supply of electric power for an auxiliary system from a power supply line connected to the sub power storage device. The first voltage converter is connected between the main power supply line and the power supply line, and configured to convert an output voltage of the main power storage device into a level of an output voltage of the sub power storage device and output the output voltage to the power supply line. The second voltage converter is configured to convert an output voltage of the charger into the level of the output voltage of the sub power storage device and output the output voltage to the power supply line. The controller includes a first control unit operated by electric power supplied from the sub power storage device to control the first switch, the first voltage converter and the power control unit; and a second control unit operated by electric power supplied from the sub power storage device to control the second switch, the second voltage converter and the charger. At the time of external charging, the first switch is opened while the second switch is closed, and at a time of vehicle running, the first switch is closed while the second switch is opened.

According to the above-described power source system, while external charging can be performed in the state where the vehicle running system (the first switch, the power control unit, the electric motor, the first voltage converter, and the first control unit) is stopped, the vehicle can run in the state where the external charging system (the second switch, the charger, the second voltage converter, and the second control unit) is stopped. In other words, since the vehicle running system and the external charging system can be completely separated, the durability and the life of each component of the vehicle running system can be prevented from being changed due to the influence of external charging. Furthermore, the durability and the life of each component of the external charging system can also be designed in consideration only of external charging. Consequently, the system configuration can be optimized in a simplified design.

Preferably, the power source system further includes third and fourth switches. The third switch is connected between the power supply line and the first control unit. The fourth switch is connected between the power supply line and the second control unit. The third switch is opened at the time of external charging and closed at the time of vehicle running. The fourth switch is closed at the time of external charging and opened at the time of vehicle running.

By such an approach, the first control unit and the second control unit can be activated separately between at the time of vehicle running and at the time of external charging. Consequently, the life of each control unit can be lengthened while power consumption can be reduced.

Further preferably, the second control unit is configured, when an output of the sub power storage device falls below a prescribed lower limit level while the electric powered vehicle is not running, to charge the sub power storage device with electric power from the main power storage device by closing the second switch and operating the second voltage converter.

By such an approach, even in a configuration in which the output of the main power storage device is unavailable at the start of external charging due to separation between the vehicle running system and the external charging system, charging of the sub power storage device can be controlled while the vehicle is not running, so as to ensure the lower limit level output required to start external charging.

Alternatively preferably, when an instruction is made to perform external charging, the controller starts a process for external charging after confirming that the first switch is opened.

By such an approach, it becomes possible to reliably prevent the output voltage (high voltage) of the main power storage device from being applied to the components following the first switch such as the power control unit at the time of external charging. Consequently, reduction of the life of each component caused by the influence of external charging can be prevented.

Preferably, the second voltage converter is less in output capacity and power consumption during an operation than the first voltage converter.

By such an approach, it becomes possible to improve the efficiency of external charging by using the second voltage converter of small capacity in accordance with the fact that the electric power for the auxiliary system required at the time of external charging is significantly less than that at the time of vehicle running.

Further preferably, when determining that the electric power for the auxiliary system is insufficient with an output of the second voltage converter during execution of external charging, the second control unit generates an operation request for the first voltage converter. The first control unit then responds to the operation request to close the first switch and operate the first voltage converter.

By such an approach, it becomes possible to achieve the configuration in which the electric power for the auxiliary system is supplied basically by the second voltage converter of small capacity in order to improve the efficiency while the first voltage converter is operated when electric power is insufficient. Accordingly, the efficiency at the time of external charging can be improved while the auxiliary load for the low voltage system can be reliably operated.

Advantageous Effects of Invention

According to the present invention, in the electric powered vehicle chargeable by an external power source, the durability and the life of each component of the power source system can be prevented from being changed due to the influence of external charging, to thereby optimize the system configuration in a simplified design.

DESCRIPTION OF EMBODIMENTS

Figure 1:
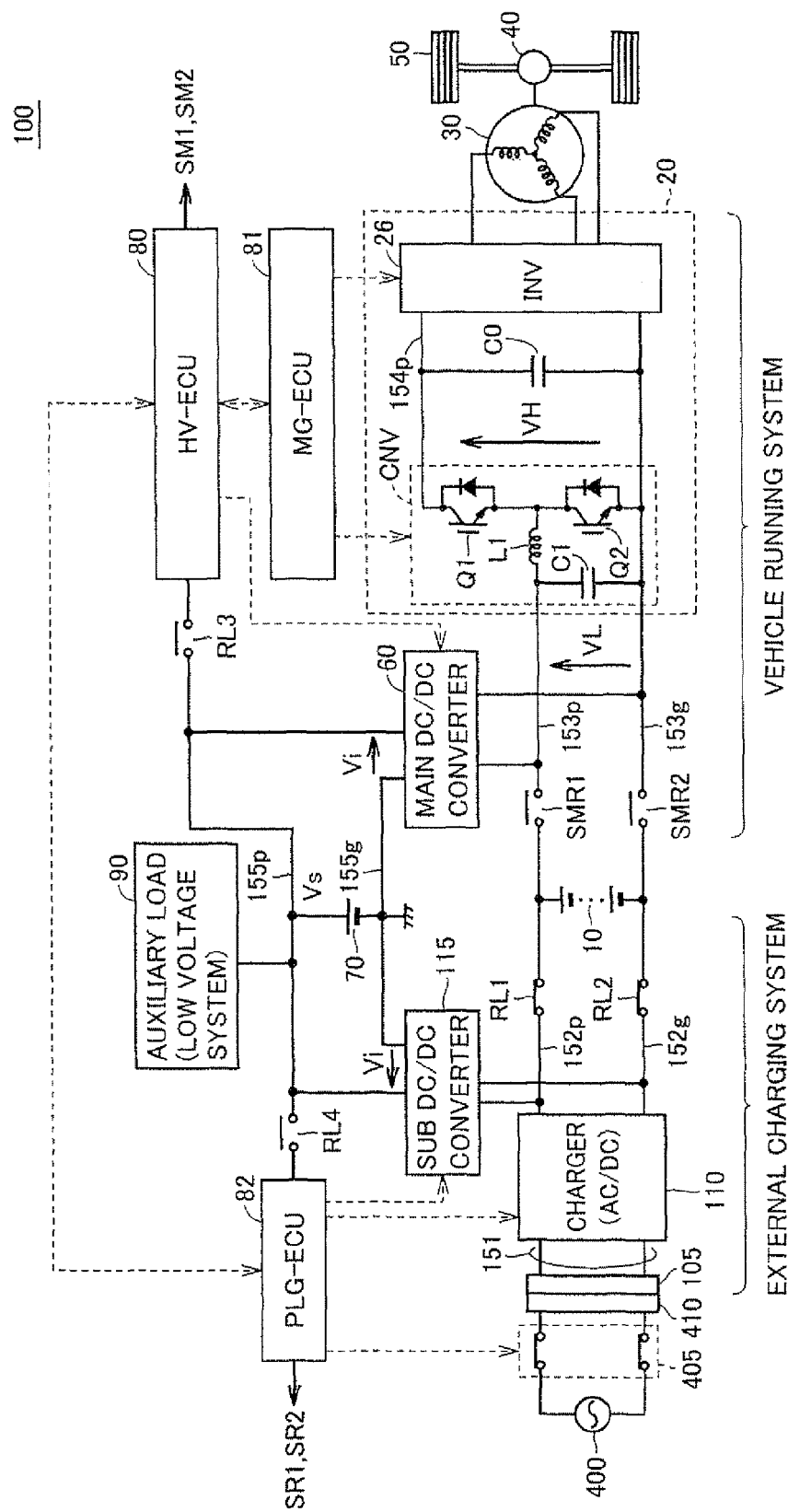
FIG. 1 is a block diagram showing the configuration of a power source system for an electric powered vehicle in accordance with an embodiment of the present invention.

The embodiments of the present invention will be hereinafter described in detail with reference to the accompanying drawings, in which the same or corresponding components in each figure are designated by the same reference characters, and description thereof will not be repeated in principle.

FIG. 1 is a block diagram showing a configuration for a power source system for an electric powered vehicle in accordance with an embodiment of the present invention.

Referring to FIG. 1, an electric powered vehicle 100 includes a main battery 10, a power control unit (PCU) 20, a motor generator 30, a power transmission gear 40, driving wheels 50, and a controller consisting of a plurality of ECUs (Electronic Control Unit).

Main battery 10 is shown as an example of a "rechargeable power storage device" and typically formed by a secondary battery such as a lithium ion battery or a nickel-metal hydride battery. By way of example, the output voltage of main battery 10 is about 200V. Alternatively, the power storage device may be formed by an electric double layer capacitor, or by a combination of a secondary battery and a capacitor.

PCU 20 converts electric power stored in main battery 10 into electric power for controlling driving of motor generator 30. By way of example, motor generator 30 is implemented by a permanent magnet type three-phase electric motor, and PCU 20 is formed to include an inverter 26.

An output torque of motor generator 30 is transmitted through power transmission gear 40 formed by a reduction gear or a power split device to driving wheels 50, whereby electric powered vehicle 100 runs. At the time of regenerative braking of electric powered vehicle 100, motor generator 30 can generate electric power by the rotational force of driving wheels 50. The generated electric power is converted by PCU 20 into electric power for charging main battery 10.

Further, in a hybrid vehicle equipped with an engine (not shown) in addition to motor generator 30, coordinated operations of the engine and motor generator 30 allow generation of vehicle driving power necessary for electric powered vehicle 100. In this case, it is also possible to charge main battery 10 by using electric power generated by engine rotation.

Specifically, electric powered vehicle 100 represents a vehicle equipped with an electric motor for generating power for driving the vehicle, and includes a hybrid vehicle in which the vehicle driving power is generated by an engine and an electric motor, and an electric vehicle and a fuel cell vehicle which are not equipped with an engine.

The "power source system for an electric powered vehicle" is formed by the configuration of electric powered vehicle 100 shown in the figure, with motor generator 30, power transmission gear 40 and driving wheels 50 removed. In the following, the configuration of the power source system will be described in detail.

Power control unit (PCU) 20 includes a converter CNV, a smoothing capacitor C0 and inverter 26.

Converter CNV is configured to perform DC (direct-current) voltage conversion between a DC voltage VL of a power supply line 153p and a DC voltage VH of a power supply line 154p.

Power supply line 153p and a ground line 153g are electrically connected to a positive electrode terminal and a negative electrode terminal of main battery 10 through system main relays SMR1 and SMR2, respectively. Smoothing capacitor C0 is connected to power supply line 154p and smoothes a DC voltage. Similarly, a smoothing capacitor C1 is connected to power supply line 153p and smoothes DC voltage VL.

Converter CNV is configured as a chopper circuit including power semiconductor switching elements (hereinafter also simply referred to as "switching elements") Q1 and Q2, a reactor L1 and a smoothing capacitor C1, as shown in FIG. 1. Anti-parallel diodes are connected to switching elements Q1 and Q2, respectively, and therefore, converter CNV can execute bi-directional voltage conversion between power supply lines 153p and 154p. Alternatively, by keeping switching element Q1 as an upper arm element to be ON and keeping switching element Q2 as a lower arm element to be OFF, converter CNV can be operated so as to equalize the voltages of power supply lines 154p and 153p (VH=VL).

Inverter 26 is a general three-phase inverter and, therefore, detailed circuit structure thereof is not shown. By way of example, inverter 26 is configured such that upper and lower arm elements are arranged for each phase, and a node between the upper and lower arm elements of each phase is connected to a stator coil winding of the corresponding phase of motor generator 30.

When electric powered vehicle 100 is running (which will be hereinafter simply referred to as "at the time of vehicle running"), each switching element of inverter 26 is controlled to be turned on/off by MG-ECU 81, whereby the DC voltage on power supply line 154p is converted into a three-phase AC (alternating-current) voltage and supplied to motor generator 30. Alternatively, at the time of regenerative braking of electric powered vehicle 100, each switching element of inverter 26 is controlled to be turned on/off by MG-ECU 81 such that the AC voltage from motor generator 30 is converted into a DC voltage and output to power supply line 154p.

In the present embodiment, in addition to the state where electric powered vehicle 100 is actually running (vehicle speed≠0), the expression of "at the time of vehicle running" represents the state in which electric powered vehicle 100 is able to run by an operation, for example, of an ignition switch. Specifically, the expression of "at the time of vehicle running" also covers the state where the vehicle speed≠0. It is noted that external charging of main battery 10 is never performed at the time of vehicle running.

As an ECU forming the controller, while FIG. 1 illustrates an HV-ECU 80 for controlling the operation of electric powered vehicle 100 at the time of vehicle running, MG-ECU 81 for controlling the operation of PCU 20, and a PLG-ECU 82 for controlling the external charging operation, it also describes for the purpose of confirmation that other ECUs may be disposed.

With regard to control of motor generator 30, HV-ECU 80 and MG-ECU 81 are hierarchically configured, in which MG-ECU 81 controls PCU 20 to drive motor generator 30 in accordance with the operation command value from HV-ECU 80.

Each ECU is formed by an electronic control unit including a CPU (Central Processing Unit) and a memory which are not shown, and configured to perform operations using values detected by various sensors, based on a map and a program stored in the memory. At least part of the ECUs may be configured to execute prescribed numerical/logical operation by hardware such as an electronic circuit. Each ECU operates when a power supply voltage of the low voltage system is supplied from a power supply line 155p.

The power source system for electric powered vehicle 100 further includes, as a configuration of the low voltage system (auxiliary system), a main DC/DC converter 60, an auxiliary battery 70, power supply line 155p, relays RL3 and RL4, and an auxiliary load 90. Auxiliary battery 70 is connected between power supply line 155p and a ground line 155g. Auxiliary battery 70 is also shown as an example of the "rechargeable power storage device", as in the case of main battery 10. By way of example, auxiliary battery 70 is formed of a lead battery. The output voltage of auxiliary battery 70 corresponds to a power supply voltage Vs of the low voltage system. Rating of power supply voltage Vs is lower than the output voltage of main battery 10 and, for example, approximately 12V.

Main DC/DC converter 60 is configured to lower DC voltage VL corresponding to the output voltage of main battery 10 to be converted into a DC voltage of the output voltage level of auxiliary battery 70. An output rated voltage Vi of main DC/DC converter 60 is set such that auxiliary battery 70 can be charged.

Main DC/DC converter 60 is typically a switching regulator including a semiconductor switching element (not shown), and a well-known arbitrary circuit configuration may be applied thereto. The output side of main DC/DC converter 60 is connected to power supply line 155p. The input side of main DC/DC converter 60 is connected to power supply line 153p and ground line 153g.

To power supply line 155p, auxiliary load 90 of the low voltage system is connected. Auxiliary load 90 includes, for example, audio equipment, navigation equipment, and illumination devices (hazard lamp, room lamp, head lamp and the like). Each at the time of vehicle running and the time of external charging, these auxiliary loads operate in accordance with a user operation and consumes electric power.

Relay RL3 is electrically connected between power supply line 155p and HV-ECU 80. Relay RL4 is electrically connected between power supply line 155p and PLG-ECU 82. Although not shown, with regard to PLG-ECU 82, the minimum circuit elements required for the activation process is configured to continuously receive electric power from auxiliary battery 70 without through relay RL4 while any circuit elements other than those are configured to receive electric power through relay RL4, with the result that the standby power is reduced.

Furthermore, to power supply line 153p and ground line 153g, an auxiliary machine for a high-voltage system (not shown) may be connected, which operates using the output voltage of main battery 10 as a power source. The auxiliary machine for a high-voltage system includes, for example, an inverter for air conditioner (A/C inverter).

Further, the power source system for electric powered vehicle 100 includes, as a configuration for external charging of main battery 10, a charging connector 105, a charger 110, a sub DC/DC converter 115, and relays RL1 and RL2.

Charging connector 105 is electrically connected to an external power source 400 as it is connected to a charging plug 410 of a charging cable that is connected to external power source 400. It is assumed that the charging cable contains a relay 405 for cutting off a charging path of external power source 400. Generally, external power source 400 is provided as a commercial AC power supply.

In place of the configuration shown in FIG. 1, a configuration in which external power source 400 and electric powered vehicle 100 are electromagnetically coupled in non-contact manner to supply electric power may be used. Specifically, a primary coil is provided on the side of the external power source, a secondary coil is provided on the side of the vehicle, to utilize the mutual inductance between the primary and secondary coils, so that electric power may be supplied from external power source 400 to electric powered vehicle 100. Even when such external charging is performed, the configuration following charger 110 for converting the electric power supplied from external power source 400 can be used in common.

A power supply line 151 electrically connects charging connector 105 and charger 110. Charger 110 converts the AC voltage from external power source 400 transmitted to power supply line 151 into a DC voltage for charging main battery 10. The converted DC voltage is output across a power supply line 152p and a ground line 152g. By feedback control of the output voltage and/or the output current, charger 110 charges main battery 10 in accordance with a charge command at the time of external charging. The charge command is set in accordance with the state of main battery 10, for example, SOC (State Of Charge) and temperature.

Relay RL1 is electrically connected between power supply line 152p and a positive electrode of main battery 10. Relay RL2 is electrically connected between ground line 152g and the negative electrode of main battery 10.

Sub DC/DC converter 115 converts the DC voltage (charging voltage of main battery 10) converted by charger 110 into a DC voltage of the output voltage level of auxiliary battery 70. In other words, sub DC/DC converter 115 is equivalent in rated output voltage Vi to main DC/DC converter 60. The output of sub DC/DC converter 115 is supplied to power supply line 155p. Sub DC/DC converter 115 may be formed integrally with charger 110.

Sub DC/DC converter 115 is formed by a switching regulator including a semiconductor switching element (not shown) similarly to main DC/DC converter 60, and a well-known arbitrary circuit structure may be adopted.

Each of relays RL1 to RL4 and system main relays SMR1 and SMR2 is formed by an electromagnetic relay that is closed (ON) when an excitation current is supplied by an excitation circuit that is not shown, and opened (OFF) when the excitation current is not supplied. An arbitrary circuit element may be used as a relay or a system main relay provided that it is a switch allowing control of conduction (on)/non-conduction (off) of a conduction path. Relays RL1 and RL2 provided corresponding to the configuration for external charging are also referred to as "external charging relays".

MG-ECU 80 generates control commands SM1 and SM2 for instructing system main relays SMR1 and SMR2 to be turned on. PLG-ECU 82 generates control commands SR1 and SR2 for instructing external charging relays RL1 and RL2 to be turned on. In response to each of control commands SM1, SM2, SR1, and SR2, an excitation current for the corresponding system main relay or external charging relay is generated, using auxiliary battery 70 as a power source. When control commands SM1, SM2, SR1, and SR2 are not generated, the corresponding system main relay or external charging relay is maintained in an OFF (opened) state.

It is assumed that relays RL3 and RL4 are controlled to be turned on/off by other ECUs which are not shown, in response to the key operation and external charging instruction by the driver. Specifically, in response to the operation of the ignition switch, relay RL3 is turned on/off. Relay RL4 is turned on while external charging is being performed, and turned off while external charging is not being performed.

Then, the operation of the power source system each at the time of vehicle running and at the time of external charging will be described.

At the time of vehicle running, system main relays SMR1 and SMR2 are turned on, while external charging relays RL1 and RL2 are turned off. Further, since relay RL3 serves to control power supply to each component of the vehicle running system, it is turned on in response to turning on (IG on) of the ignition switch. On the other hand, relay RL4 is turned off at the time of vehicle running since it is turned off at the time other than the time of external charging.

In addition, at the time of external charging, system main relays SMR1 and SMR2 are turned off while external charging relays RL1 and RL2 are turned on. Furthermore, since relay RL4 is turned on, PLG-ECU 82 is operated. Also, since the ignition switch is not required to be turned on at the time of external charging, relay RL3 that is basically turned off at the time of external charging may be turned on by the operation of the ignition switch.

At the time of vehicle running, the output voltage from main battery 10 is transmitted through system main relays SMR1 and SMR2 that are on, to power supply line 153p and ground line 153g. PCU 20 controls driving of motor generator 30 by power conversion between power supply line 153p electrically connected to main battery 10 and motor generator 30. In other words, electric powered vehicle 100 can run using the electric power of main battery 10. On the other hand, the components for external charging such as external charging relays RL1, RL2, charger 110, sub DC/DC converter 115, and PLG-ECU 82 (hereinafter also comprehensively referred to as an external charging system) can be stopped at the time of vehicle running. Therefore, the components of the external charging system can be designed in consideration only of the operation at the time of external charging.

At the time of vehicle running, in the low voltage system (auxiliary system), main DC/DC converter 60 is operated to generate a power supply voltage Vs for the low voltage system from the output voltage of main battery 10 transmitted to power supply line 153p via system main relays SMR1 and SMR2. In other words, the power capacity (rated output) of main DC/DC converter 60 is designed to cover the power consumption by the ECU groups and auxiliary load 90 at the time of vehicle running, and therefore, the power capacity becomes relatively large (for example, the rated current is an order of 100 A).

At the time of external charging, the above-described external charging system is operated. Consequently, main battery 10 is charged by the DC voltage obtained by converting the AC power from external power source 400 by charger 110 through external charging relays RL1 and RL2 that are on. In the low voltage system (auxiliary system), sub DC/DC converter 115 operates while main DC/DC converter 60 is basically stopped. Specifically, in main DC/DC converter 60, the switching element is kept turned off, and therefore, power loss associated with power conversion is not incurred.

The power capacity (rated output) of sub DC/DC converter 115 is designed to cover the usual power consumption of the auxiliary system (low voltage system) at the time of external charging. Therefore, the output capacity of sub DC/DC converter 115 can be significantly suppressed (for example, approximately two to three orders of magnitude at the rated current) as compared with the output capacity of main DC/DC converter 60. Consequently, as compared with the configuration in which main DC/DC converter 60 is shared also at the time of external charging, the power consumption (power loss in the DC/DC converter) for generating a voltage for the auxiliary system is decreased, so that the efficiency of external charging can be improved. As may be understood from the configuration in FIG. 1, the output of sub DC/DC converter 115 can be used also for charging auxiliary battery 70.

Furthermore, the components for vehicle running such as system main relays SMR1, SMR2, PCU 20, main DC/DC converter 60, HV-ECU 80, and MG-ECU 81 (hereinafter also comprehensively referred to as a vehicle running system) can be completely stopped at the time of external charging. Furthermore, as system main relays SMR1 and SMR2 are off, power supply line 153p and ground line 153g are electrically disconnected from charger 110 and main battery 10. Therefore, since the output voltage (DC voltage VL) of main battery 10 is not applied to each component of the vehicle running system, the durability and the life of each component can be prevented from being changed due to the influence of external charging.

Figure 2:
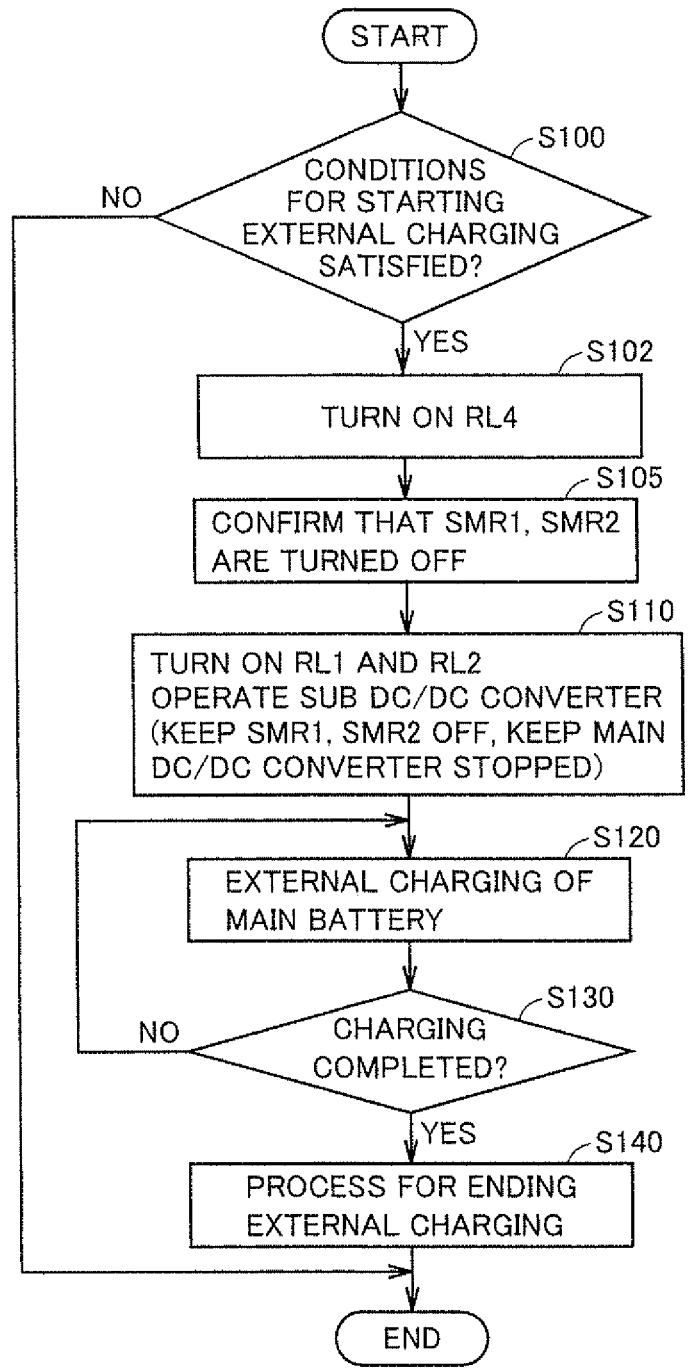
FIG. 2 is a flowchart representing process steps of control at the time of external charging, by the power source system in accordance with an embodiment of the present invention.
Figure 3:
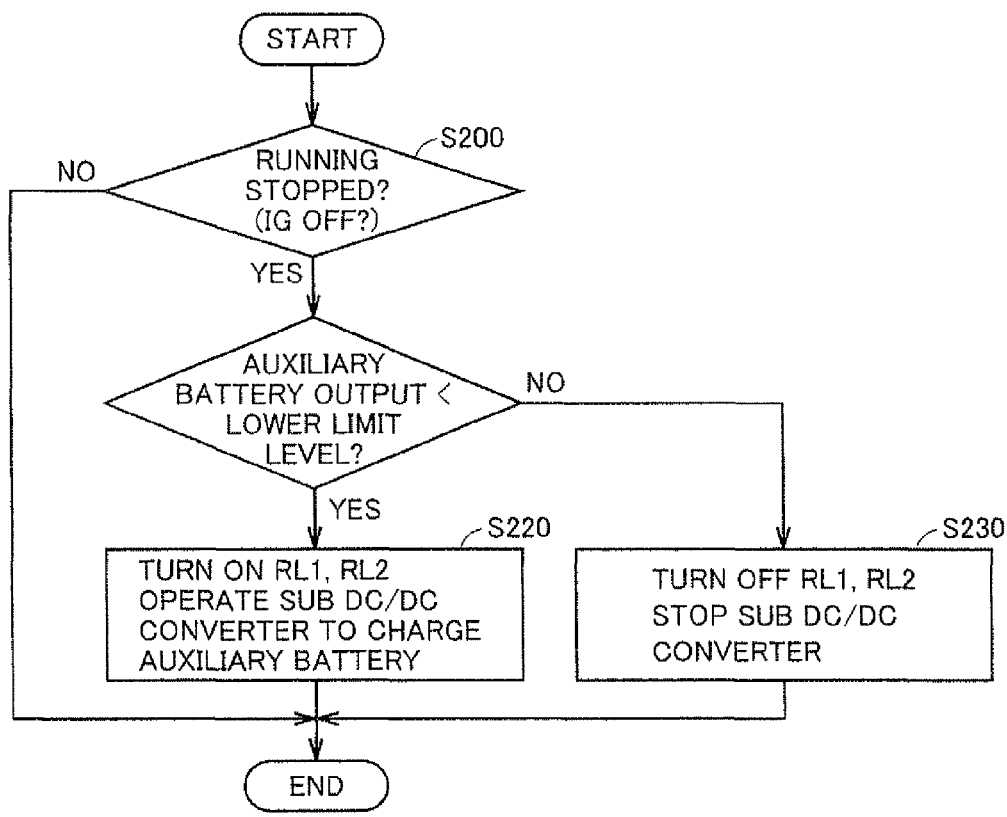
FIG. 3 is a flowchart representing the charging control of an auxiliary battery while the vehicle running is stopped, by the power source system in accordance with an embodiment of the present invention.

FIG. 2 is a flowchart representing process steps of control at the time of external charging, by the power source system in accordance with an embodiment of the present invention. It is noted that each of the steps in the flowcharts below including FIG. 3 is basically realized by software processing by an ECU, but may be realized by hardware processing.

Referring to FIG. 2, at step S100, by the element of PLG-ECU 82 that directly receives electric power from auxiliary battery 70, it is determined whether or not conditions for starting external charging are satisfied. By way of example, if charging connector 105 is electrically connected through a normally attached charging cable (charging plug 410) to external power source 400 and the external charging is requested by the switch operation by the user or by automatic setting of time and the like, it is determined as YES at step S100, to start external charging. If it is determined as NO at step S100, the following process steps are not executed.

When external charging is started (determined as YES at S100), relay RL4 is turned on at step S102. Consequently, electric power is supplied from auxiliary battery 70 to the entire PLG-ECU 82, so that external charging process can be performed.

PLG-ECU 82 confirms at step S105 that system main relays SMR1 and SMR2 are turned off. In this case, when system main relays SMR1 and SMR2 are turned on, it is recognized that the vehicle running system is in the status where it can be activated by application of a high voltage (an output voltage of main battery 10). Accordingly, for example, the determination at step S105 can be made by confirming whether this status occurs or not.

Then, when system main relays SMR1 and SMR2 are turned on, PLG-ECU 82 requests HV-ECU 80 to turn off system main relays SMR1 and SMR2. In other words, also when the ignition switch is turned on, system main relays SMR1 and SMR2 are turned off prior to external charging. If system main relays SMR1 and SMR2 cannot be turned off, a warning message and the like is output to the user without starting external charging.

In order to start external charging, at step S110, PLG-ECU 82 then turns on external charging relays RL1 and RL2 and operates sub DC/DC converter 115. Also, main DC/DC converter 60 is kept stopped and system main relays SMR1 and SMR2 are kept turned off.

When the start process of steps S100 to S110 ends, at step S120, PLG-ECU 82 charges main battery 10 by electric power from external power source 400, using charger 110.

At step S130, PLG-ECU 82 determines, in every prescribed period during external charging, whether or not charging of main battery 10 is completed. By way of example, the determination of step S130 can be made based on the SOC, the amount of charging power, the charging time and the like of main battery 10.

It is determined as NO at step S130 until charging is completed, and therefore, step S120 is executed repeatedly.

When charging is complete (determined as YES at S130), at step S140, PUG-ECU 82 executes the process for ending the external charging. In the process for ending the external charging, for example, external charging relays RL1, RL2 and relay 405 (charging cable) that have been ON are turned off.

In this way, according to the power source system for the electric powered vehicle in accordance with the present embodiment, external charging can be performed in the state where the vehicle running system (system main relays SMR1, SMR2, PCU 20, main DC/DC converter 60, HV-ECU 80, MG-ECU 81, and the like) is stopped, while the vehicle can run in the state where the external charging system (external charging relays RL1, RL2, charger 110, sub DC/DC converter 115, PLG-ECU 82, and the like) is stopped.

In other words, since the vehicle running system and the external charging system can be completely separated, the durability and the life of each component of the vehicle running system can be prevented from being changed due to the influence of external charging. Furthermore, the durability and the life of each component of the external charging system can also be defined in consideration only of external charging. Consequently, the system configuration can be optimized in a simplified design.

Furthermore, since external charging is started after confirming that system main relays SMR1 and SMR2 are turned off, it becomes possible to reliably prevent a high voltage (an output voltage of main battery 10) from being applied to circuitry of the succeeding stage such as PCU 20.

Furthermore, at the time of external charging, main DC/DC converter 60 is stopped while the electric power for the auxiliary system is supplied by sub DC/DC converter 115 of small capacity. Therefore, the efficiency of external charging can be improved.

In the configuration shown in FIG. 1, main battery 10 corresponds to the "main power storage device", and auxiliary battery 70 corresponds to the "sub power storage device". Further, main DC/DC converter 60 corresponds to the "first voltage converter", and sub DC/DC converter 115 corresponds to the "second voltage converter". Further, system main relays SMR1 and SMR2 correspond to the "first switch", external charging relays RL1 and RL2 correspond to the "second switch", relay RL3 corresponds to the "third switch", and relay RL4 corresponds to the "fourth switch". Power supply line 155p corresponds to the "power supply line" supplying electric power for the auxiliary system, and power supply line 153*p* and ground line 153*g* correspond to the "main power supply line". Furthermore, HV-ECU 80 corresponds to the "first control unit", and PLG-ECU 82 corresponds to the "second control unit".

In the power source system for an electric powered vehicle (FIG. 1) in accordance with the present embodiment, at the start of external charging, it is necessary to control relays (at least turn on external charging relays RL1 and RL2) while the voltage for the auxiliary system cannot be supplied by main DC/DC converter 60. Therefore, it is necessary that the output of auxiliary battery 70 is reliably kept higher than the lower limit level at which the excitation current of the relay can be supplied.

Therefore, in a period from the end of vehicle running till the start of external charging, it is preferable that PLG-ECU 82 executes the control process in accordance with the flowchart of FIG. 3 in every prescribed period, for charging control of auxiliary battery 70.

Referring to FIG. 3, at step S200, HV-ECU 80 determines in every prescribed period whether or not the vehicle running is stopped, for example, based on whether or not the ignition switch is off. Basically, if the vehicle running is stopped, that is, if the ignition switch is turned off, system main relays SMR1 and SMR2 are turned off and main DC/DC converter 60 is stopped. Furthermore, at the time when external charging is not performed, external charging relays RL1 and RL2 are turned off while sub DC/DC converter 115 is stopped.

While the vehicle running is stopped (determined as YES at S200), PLG-ECU 82 confirms at step S110 whether or not the output of auxiliary battery 70 is lower than the lower limit level. By way of example, the determination at step S210 is made based on the SOC of auxiliary battery 70 or power supply voltage Vs. This lower limit level is set to provide a sufficient margin with respect to the output level at which the process of starting external charging can be performed (including supply of an excitation current of each of external charging relays RL1, RL2, relay RL4, and the like).

If the output of auxiliary battery 70 falls below the lower limit level (YES at S210), at step S220, PLG-ECU 82 turns on external charging relays RL1 and RL2 (also turns on relay RL4, if necessary), and operates sub DC/DC converter 115. Accordingly, auxiliary battery 70 is charged by sub DC/DC converter 115 lowering the output voltage of main battery 10. Consequently, the state of charge of auxiliary battery 70 is controlled such that the output of the lower limit level mentioned above can be ensured even while the vehicle running is stopped.

On the other hand, if it is determined as NO at S210, at step S230, HV-ECU 80 turns off external charging relays RL1 and RL2, and stops sub DC/DC converter 115.

By the auxiliary battery charging control shown in FIG. 3, even in the power source system having a configuration in which main DC/DC converter 60 is basically disconnected from main battery 10 at the start of external charging, the output of auxiliary battery 70 required for the process of starting external charging can be ensured.

(Modification of External Charging Control)

In the power source system for an electric powered vehicle in accordance with the present embodiment shown in FIG. 1, it is preferable to suppress the power capacity of sub DC/DC converter 115 low in order to improve the efficiency of external charging. Accordingly, it may be possible that the electric power for the auxiliary system runs short with the output of sub DC/DC converter 115, depending on the status of use of auxiliary load 90. Therefore, in the modification in accordance with the present embodiment, the power supply for the auxiliary system is controlled in the following manner.

Figure 4:
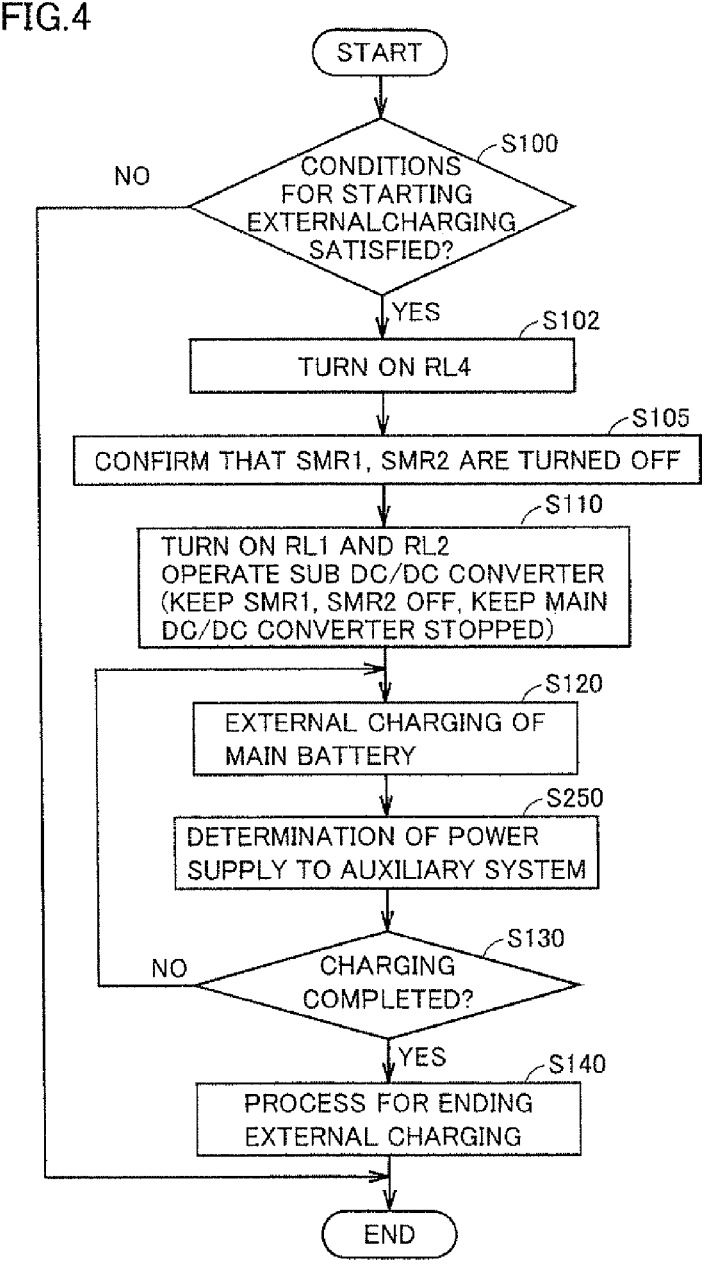
FIG. 4 is a flowchart representing process steps of control at the time of external charging, by the power source system in accordance with the modification of an embodiment of the present invention.

FIG. 4 is a flowchart representing process steps of control at the time of external charging, by the power source system in accordance with the modification of an embodiment of the present invention.

In the flowchart shown in FIG. 4, as compared with the flowchart shown in FIG. 2, PLG-ECU 82 executes, at step S250, determination of power supply to the auxiliary system during external charging (S120). Since other process steps in FIG. 4 are the same as those in FIG. 2, detailed description thereof will not be repeated.

Then, PLG-ECU 82 repeatedly executes steps S120 and S250 until charging is completed (while it is determined as NO at S130). In other words, main battery 10 is externally charged (S120) while the electric power for the auxiliary system is supplied in accordance with the determination of power supply for the low voltage system at step S250.

Figure 5:
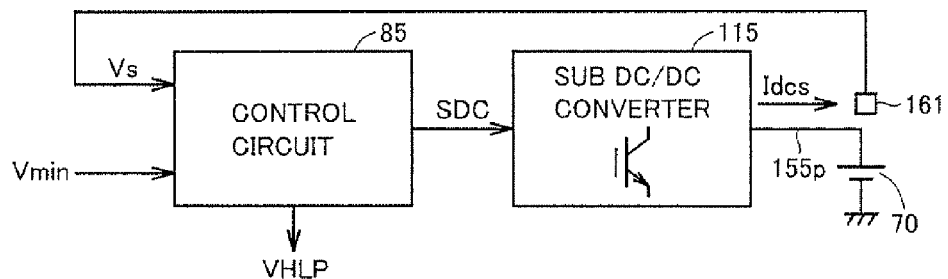
FIG. 5 is a block diagram representing auxiliary system power supply control at the time of external charging, by the power source system in accordance with the modification of an embodiment of the present invention.

FIG. 5 is a block diagram representing auxiliary system power supply control at the time of external charging, in accordance with the modification of an embodiment of the present invention.

Referring to FIG. 5, a control circuit 85 controls sub DC/DC converter 115 to be operated and stopped by a control command SDC. Further, control circuit 85 is configured to be capable of generating an operation request VHLP for main DC/DC converter 60 to HV-ECU 80 during external charging. Control circuit 85 corresponds to a functional block controlling power supply to the low voltage system at the time of external charging, that is realized by PLG-ECU 82.

When operated, sub DC/DC converter 115 outputs a rated voltage that corresponds to the power supply voltage for the low voltage system. By way of example, sub DC/DC converter 115 changes an output current Ides by controlling the duty ratio of the switching element such that the output of the rated voltage can be maintained. Output current Idcs varies within the range of the rated capacity (power, current) of sub DC/DC converter 115. Specifically, if the power consumption by the low voltage auxiliary system (auxiliary system power) cannot be covered by the maximum output current Imax that corresponds to the rated capacity, the power consumption by auxiliary load 90 is covered by the electric power from auxiliary battery 70. Therefore, when the SOC of auxiliary battery 70 lowers, its output voltage (that is, power supply voltage Vs) also lowers. When power supply voltage Vs falls below the lower limit voltage that ensures the operation of the ECU and the like, the power source system may not be able to normally operate.

Then, at the time of external charging, if it is determined that the output of sub DC/DC converter 115 is insufficient for the power consumption by auxiliary load 90, control circuit 85 generates operation request VHLP to HV-ECU 80.

In response to generated operation request VHLP, HV-ECU 80 operates main DC/DC converter 60 and turns on system main relays SMR1 and SMR2. In addition, in response to operation request VHLP, relay RL3 should also be turned on by another ECU which is not shown.

At this time, the power to be supplied to auxiliary load 90 and auxiliary battery 70 may be generated both by main DC/DC converter 60 and sub DC/DC converter 115, or the power for the auxiliary system may be generated only by main DC/DC converter 60. Consequently, main DC/DC converter 60 is used to allow electric power greater than that provided by sub DC/DC converter 115 to be supplied to auxiliary load 90 and auxiliary battery 70.

As described above, when the output of sub DC/DC converter 115 runs short, power supply voltage Vs lowers. Therefore, when voltage Vs detected by a voltage sensor 161 provided in power supply line 155$p$ falls below a prescribed lower limit voltage Vmin, control circuit 85 can determine that the output of sub DC/DC converter 115 is insufficient. This lower limit voltage Vmin can be set so as to correspond to the lower limit voltage that ensures the operations of auxiliary load 90, the ECU and the like, as described above.

Control circuit 85 may determine whether the output of sub DC/DC converter 115 is insufficient or not by comparing the determination value and the SOC of auxiliary battery 70, rather than using power supply voltage Vs. The SOC of auxiliary battery 70 may be obtained by a general method of calculating the battery SOC, for example, based on an integrated value of charging/discharging currents detected by a current sensor which is not shown, or based on an open voltage detected by a voltage sensor which is not shown. Alternatively, control circuit 85 may determine whether or not the output of sub DC/DC converter 115 is insufficient, based on the state of operation of auxiliary load 90 (for example, the state where each equipment is turned on/off). For example, the output of sub DC/DC converter 115 may be determined as being insufficient, at the time of the operation of a specific auxiliary load (for example, a headlight and the like) that is not essentially used during external charging but consumes relatively large power.

Figure 6:
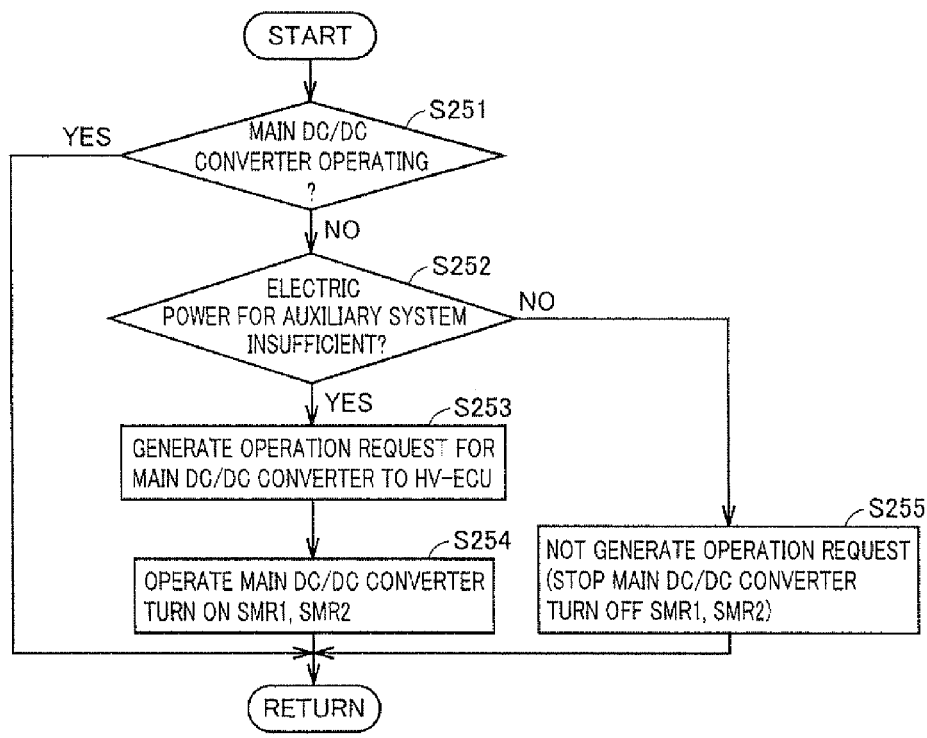
FIG. 6 is a flowchart representing the first example of auxiliary system power supply determination.

FIG. 6 shows details of the determination of power supply to the auxiliary system at step S250 in FIG. 4.

Referring to FIG. 6, PLG-ECU 82 determines at step S251 whether or not main DC/DC converter 60 that was stopped at the start of external charging is operating. If main DC/DC converter 60 is operating (determined as YES at S251), ECU 80 generates a power supply voltage for the low voltage system (auxiliary system) while maintaining the present state, that is, using main DC/DC converter 60.

If main DC/DC converter 60 is stopped (determined as NO at S251), PLG-ECU 82 determines at step S252 whether or not the electric power for the auxiliary system supplied from sub DC/DC converter 115 is insufficient. If the electric power for the auxiliary system is insufficient (determined as YES at S252), at step S253, PLG-ECU 82 generates an operation request for main DC/DC converter 60 to HV-ECU 80.

Accordingly, HV-ECU 80 operates main DC/DC converter 60 while turning on system main relays SMR1 and SMR2 (step S254). Thus, using main DC/DC converter 60, preferably, using both sub DC/DC converter 115 and main DC/DC converter 60, the power supply voltage for the low voltage system (auxiliary system) is generated. As a result, operational electric power required by auxiliary load 90 can reliably be provided.

On the other hand, if the electric power for the auxiliary system is sufficient (determined as NO at step S252), at step S255, PLG-ECU 82 does not generate an operation request for main DC/DC converter 60. Consequently, main DC/DC converter 60 is kept stopped while system main relays SMR1 and SMR2 are kept turned off. It is to be noted that the determination at step S252 can be made in the similar manner as the generation of operation request VHLP by control circuit 85 shown in FIG. 3.

Figure 7:
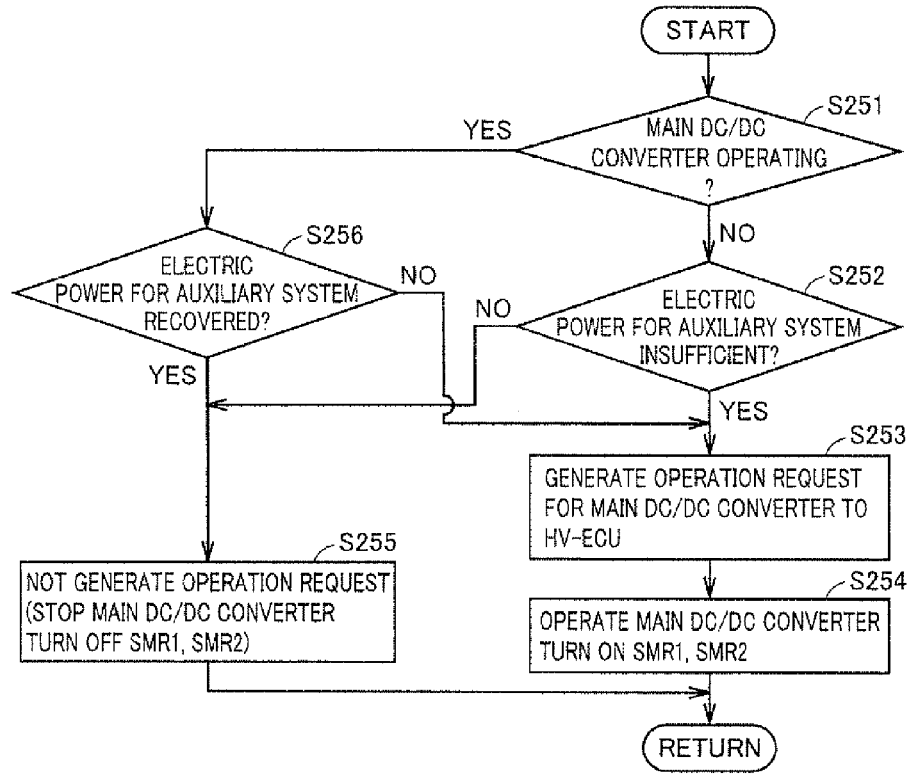
FIG. 7 is a flowchart representing the second example of auxiliary system power supply determination.

Alternatively, as a process after main DC/DC converter 60 operated once, a step S256 may be added to the flowchart of FIG. 6, as shown in FIG. 7.

If it is determined as YES at step S251, that is, if main DC/DC converter 60 is operating, PLG-ECU 82 determines at step S256 whether or not the shortage of electric power for the auxiliary system was overcome by using main DC/DC converter 60. For example, if power supply voltage Vs or the SOC of auxiliary battery 70 is recovered over a prescribed value, it is determined as YES at step S256, and if not, it is determined as NO.

If it is determined as YES at S256, the process proceeds to step S254 at which PLG-ECU 82 does not generate the operation request to HV-ECU 80. Thus, HV-ECU 80 stops main DC/DC converter 60 again and also turns off system main relays SMR1 and SMR2. Consequently, the power supply voltage for the low voltage system (auxiliary system) is again generated by sub DC/DC converter 115.

By such an approach, since the period of operation of main DC/DC converter 60 during external charging can be minimized, the efficiency of external charging can be further improved. If main DC/DC converter 60 again stops at step S254, it is to be determined as NO at step S251 at the time when step S250 is executed next.

On the other hand, if it is determined as NO at step S256, the process proceeds to step S253 at which PLG-ECU 82 continuously generates the operation request for main DC/DC converter 60. Thus, in order to overcome the shortage of electric power, main DC/DC converter 60 is used, preferably, both main DC/DC converter 60 and sub DC/DC converter 115 are used, to generate the power supply voltage for the low voltage system.

As described above, according to the modification of the present embodiment, at the time of external charging, the electric power for the auxiliary system is supplied basically by sub DC/DC converter 115 of small capacity. In addition, when the electric power for the auxiliary system is insufficient only with the output capacity of sub DC/DC converter 115, main DC/DC converter 60 can be operated. Consequently, while improving the efficiency of external charging, main DC/DC converter 60 is operated in accordance with the state of power consumption of the auxiliary system (low voltage system), so that auxiliary load 90 can be reliably operated.

Further, in the present embodiment and in the modification thereof, the configuration following power supply line 153$p$ (on the load side) is not limited to the configuration shown in the figures. By way of example, in the configuration of PCU 20, converter CNV may be omitted, and the output voltage of main battery 10 may be directly used as the DC side voltage of inverter 26. Further, the load of the power source system may also have an arbitrary configuration, including the configuration for generating the power for driving the vehicle. Specifically, the present invention is applicable in common to an electric powered vehicle equipped with an externally chargeable power storage device and an electric motor for generating power for driving wheels configured to be driven by the electric power from the power storage device, including an electric vehicle and a fuel cell vehicle not equipped with an engine as well as a hybrid vehicle equipped with an engine.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applicable to an electric powered vehicle equipped with a power storage device chargeable by a power source outside the vehicle.

REFERENCE SIGNS LIST

10 main battery, 20 PCU, 26 inverter, 30 motor generator, 40 power transmission gear, 50 driving wheel, 60 main DC/DC converter (vehicle running), 70 auxiliary battery, 85 control circuit, 90 auxiliary load, 100 electric powered vehicle, 105 charging connector, 110 charger, 115 sub DC/DC converter (external charging), 151 power supply line, 152*g* ground line, 152*p*, 153*p*, 154*p*, 155*p* power supply line, 153*g*, 155*g* ground line, 400 external power source, 405 relay, 410 charging plug, C0, C1 smoothing capacitor, CNV converter, L1 reactor, Q1, Q2 power semiconductor switching element, RL1, RL2 external charging relay, RL3, RL4 relay, SDC control command (sub DC/DC converter), SM1, SM2, SR1, SR2 control command (relay), SMR1, SMR2 system main relay, VH, VL, Vi DC voltage, VHLP operation request, Vs power supply voltage (auxiliary system).

The invention claimed is:

1. A power source system for an electric powered vehicle chargeable by an external power source outside of the vehicle, comprising:
    a rechargeable main power storage device and a rechargeable sub power storage device;
    a charger configured to convert electric power supplied from said external power source into electric power for charging said main power storage device at a time of external charging for charging said main power storage device by said external power source;
    a power control unit configured to control driving of an electric motor for generating vehicle driving power, by electric power conversion between a main power supply line and said electric motor;
    a first switch connected between said main power storage device and said main power supply line;
    a second switch connected parallel to said first switch, between said charger and said main power storage device;
    an auxiliary load configured to operate by supply of electric power for an auxiliary system from a power supply line connected to said sub power storage device;
    a first voltage converter connected between said main power supply line and said power supply line, and configured to convert an output voltage of said main power storage device into a level of an output voltage of said sub power storage device and output the output voltage to said power supply line;
    a second voltage converter configured to convert an output voltage of said charger into the level of the output voltage of said sub power storage device and output the output voltage to said power supply line; and
    a controller for controlling an operation of said electric powered vehicle,
    said controller including
    a first control unit operated by electric power supplied from said sub power storage device to control said first switch, said first voltage converter and said power control unit, and
    a second control unit operated by electric power supplied from said sub power storage device to control said second switch, said second voltage converter and said charger,
    at the time of said external charging, said first switch being opened while said second switch is closed, and at a time of vehicle running, said first switch being closed while said second switch is opened.

2. The power source system for an electric powered vehicle according to claim 1, further comprising:
    a third switch connected between said power supply line and said first control unit; and
    a fourth switch connected between said power supply line and said second control unit, wherein
    said third switch is opened at the time of said external charging and closed at the time of said vehicle running, and
    said fourth switch is closed at the time of said external charging and opened at the time of said vehicle running.

3. The power source system for an electric powered vehicle according to claim 1, wherein said second control unit is configured, when an output of said sub power storage device falls below a prescribed lower limit level while said electric powered vehicle is not running, to charge said sub power storage device with electric power from said main power storage device by closing said second switch and operating said second voltage converter.

4. The power source system for an electric powered vehicle according to claim 1, wherein, when an instruction is made to perform said external charging, said controller starts a process for said external charging after confirming that said first switch is opened.

5. The power source system for an electric powered vehicle according to claim 1, wherein said second voltage converter is less in output capacity and power consumption during an operation than said first voltage converter.

6. The power source system for an electric powered vehicle according to claim 5, wherein
    when determining that the electric power for said auxiliary system is insufficient with an output of said second voltage converter during execution of said external charging, said second control unit generates an operation request for said first voltage converter, and
    said first control unit responds to said operation request to close said first switch and operate said first voltage converter.

7. The power source system for an electric powered vehicle according to claim 2, wherein said second voltage converter is less in output capacity and power consumption during an operation than said first voltage converter.

8. The power source system for an electric powered vehicle according to claim 3, wherein said second voltage converter is less in output capacity and power consumption during an operation than said first voltage converter.

9. The power source system for an electric powered vehicle according to claim 4, wherein said second voltage converter is less in output capacity and power consumption during an operation than said first voltage converter.

* * * * *